J. W. BROWN.
PROCESS OF RECOVERING METAL FROM SCRAP MATERIAL.
APPLICATION FILED JULY 15, 1914.
1,260,312.
Patented Mar. 26, 1918.
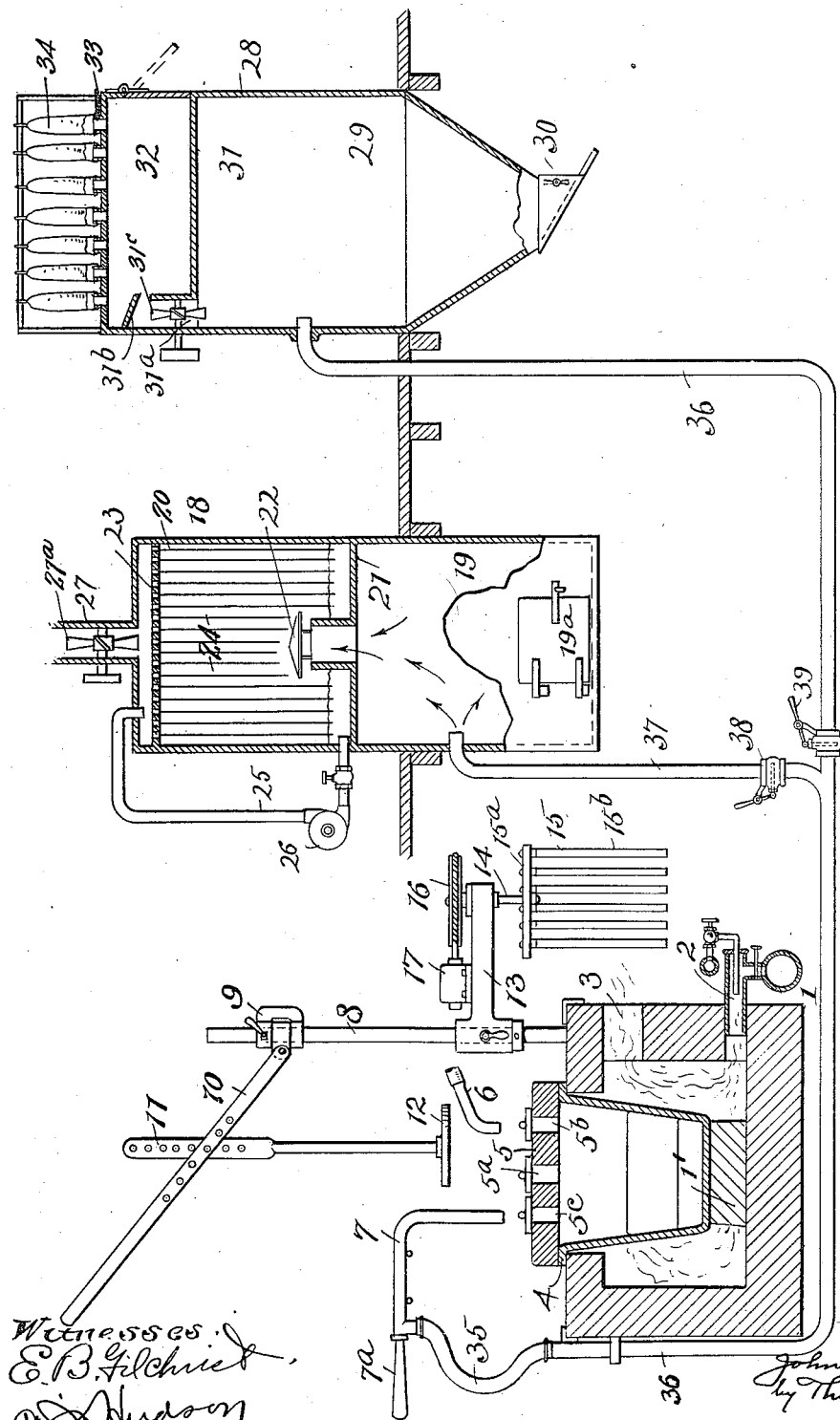

UNITED STATES PATENT OFFICE.

JOHN W. BROWN, OF LAKEWOOD, OHIO.

PROCESS OF RECOVERING METAL FROM SCRAP MATERIAL.

1,260,312.

Specification of Letters Patent.   Patented Mar. 26, 1918.

Application filed July 15, 1914.   Serial No. 851,058.

*To all whom it may concern:*

Be it known that I, JOHN W. BROWN, a citizen of the United States, residing at Lakewood, in the county of Cuyahoga and State of Ohio, have invented a certain new and useful Improvement in Processes of Recovering Metal from Scrap Material, of which the following is a full, clear, and exact description.

This invention relates to a process for the recovery of metals from scrap material containing the metal sought. The object of the invention is to provide a process which will obviate certain difficulties and objections inherent in present methods employed, and further a process which will recover the metal in such form as to be commercially usable and profitable of recovery.

Generally speaking, the invention comprises the process steps and combinations thereof set forth in the claims.

As illustrating one form of apparatus with which my process may be carried out, reference should be had to the accompanying drawings forming a part of the specification, in which the apparatus is diagrammatically illustrated in elevation.

The recovery from scrap material, such as borings, filings, turnings, clippings, punchings, sawings, etc., of certain metals and their alloys such as zinc, aluminum, etc., has been attempted by melting the scrap in a crucible, raking or stirring the mass to separate the metal therefrom and usually adding a flux to the dross material for the purpose of recovering further amounts of metal.

In some cases, the flux or portions thereof may be volatile, which represents a loss of material, as well as causing fumes which are obnoxious and in a measure harmful to the workmen manipulating the process.

Further, a large part of the metal usually separates from the mass in the crucible in the form of small globules which for some reason, possibly because they are surrounded by a film of oxid, do not flow together, and it is impossible to use the metal in this small globular form, so that the metal must be removed from the crucible and further treatment given the same before the globules are united in usable form.

In addition, the flux and skimmings being at the top of the crucible with air accessible thereto, will at a red heat cause the skimmings to burn, at times with considerable violence, which results in a very appreciable loss of material and a rapid deterioration of the melting pot.

The process of my invention is also applicable to certain condensation by-products, such as blue powder and similar material.

In my process, the disadvantages above enumerated are very largely eliminated and reduced to a minimum, and the yield of metal is in excess of the yield obtained by usual methods.

It may be well at this time to explain the apparatus shown in the drawing.

At 1 is represented a furnace of fire brick or similar material, the furnace being heated by gas from a burner represented at 2, which may be of any desired construction, as shown. Air is mixed with gas in the burner. There is a flue leading from the furnace at 3.

Mounted to extend within the furnace is a crucible 4 which may be provided with out-turned flanges resting upon the top of the furnace. The crucible may also be supported at the bottom thereof by resting upon a pier 1' within the furnace.

The crucible is provided with a cover which is split at the middle thereof, there being an opening 5ª at the center, the purpose of which will be explained later. The cover is also provided with an opening 5ᵇ which is adapted to coöperate with a pipe 6 which may be inserted therein when desired, and supplying an oxidizing, an inert, or reducing gas to the interior of the crucible, as conditions may require.

The cover is also provided with an opening 5ᶜ which may coöperate with the pipe 7 in a manner which will be later explained.

At one side of the furnace, there is an upright 8 which near its upper end has a housing 9 slidably mounted thereon, upon which housing is pivoted a lever 10. The lever carries a rod 11 upon which is a head 12. The rods 10 and 11 are provided with openings arranged in series so that the relative mounting of the rod 11 with respect to the rod 10 may be varied. The head 12 is usually of flat construction, and of somewhat smaller diameter than the diameter of the crucible. The head 12 and the parts associated therewith are for the purpose of producing pressure upon the mass of material, which may be treated within the crucible 4, the cover 5 being removed when this operation is effected.

Upon the same upright 8 there is an extending arm 13 at the outer end of which is mounted a shaft 14, which below the arm is provided with a stirring device 15 and above the arm with a worm wheel 16. This worm wheel coöperates with a worm which is driven by a motor 17. The arm 13 is mounted so that it may be swung upon the upright 8 and is properly positioned, so that it may be swung above the crucible and lowered into the same. The cover 5, as heretofore stated, is split and the opening 5ª will fit around that portion of the shaft 14 which is immediately above the stirrer 15.

At 18 there is generally represented a fume arresting device. This comprises a lower chamber 19 and an upper chamber 20. The two chambers are separated by a partition 21 which has a central opening, above which opening is a spreader 22. The chamber 19 is provided with an outlet door 19ª.

The chamber 20 has adjacent the top thereof, a support 23 from which hang a series of strips of fibrous material, represented at 24. These extend substantially to the bottom of the chamber. A pipe 25 connects the lower part of the chamber with the upper part thereof, and in this pipe line, there is a pump 26 so that liquid material may be pumped from the bottom of the chamber to the upper part thereof. As the material is pumped through the pipe 25 and discharges upon the support 23, it will, of course, spread over this support, and the arrangement is such that the liquid will flow down the fibrous strips 24, and the lower ends of the fibrous strips being immersed in the body of liquid at the lower part of the chamber 20, will also by capillary attraction assist in keeping the strips 24 saturated with the solution employed.

The construction just described is but one of a number which may be successfully used. The purpose of the chamber 20 is to afford large surface of contact between fumes and condensing liquid.

At the upper portion there is an outlet 27 which may be under suction to exhaust the air or gases after they have passed through this fume arrester 18.

The outlet 27 may have a fan 27ª of suitable type associated therewith, for the purpose of producing a suction through the chamber 20 and the parts connected therewith.

At 28 there is represented a separating device which will separate the dust or skimmings from the heavier material which may be carried to the separator. This separator consists of a lower chamber 29 which at its lower portion is provided with a gate 30 by which material collecting in the chamber 29 may be removed.

At the upper part of the chamber 29 there is a partition 31 above which extends the chamber 32. There is an opening 31ª in the partition 31 by which opening the chamber 32 is connected with the chamber 39. In the opening 31ª there is a fan 31ᶜ. The fan shown, is simply indicative of any suitable suction device which will place the chamber 29 under suction and expel air through the openings 33. In the top of the chamber 32 are a series of openings represented at 33, and for each opening 33 is a bag 34 through which the air escaping from the chamber 32 must pass, the bags acting as a sieve to remove fine particles. The bags may be supported in any desired manner.

The suction member 7 is provided with a handle 7ª and the tube of the suction member 7 is connected by means of a flexible hose 35 with a pipe 36. This pipe has a branch connection 37 which connects with the chamber 19 of the fume arrester, while the main extension of the pipe 36 connects with the chamber 29 of the separator 28. Valves 38 and 39 are connected in pipes 37 and 36 respectively, so that the passage of air or gas and other materials through these pipes may be regulated.

In carrying out the process, the scrap material in the form heretofore mentioned is placed within the crucible 4, and the crucible is heated until at least the lower part of the same is heated, and until the metal is in a soft condition, at which time the cover 5 is removed, and the compressor 12 is lowered into the crucible and applied on different portions of the surface of the mass within the same.

After this pressure has been applied through a short interval of time, the presser 12 is removed and the cover 5 is replaced. The heating is then continued until substantially the whole mass within the crucible has attained a melted or softened condition, at which time the crucible cover is again removed and the presser 12 brought into contact with the surface of the mass within the crucible. At this time, considerably more pressure is exerted upon the mass and the presser is moved to be successively brought into contact with different portions of the mass within the crucible. This pressure squeezes out the metal from the mass within the crucible and pushes the refractory dross material down to the bottom, so that it occupies a position which may be represented as below the line 39 in the figure, while the metal will be above the position occupied by the dross. The pressure thus applied also causes the union of the particles of metal as they are squeezed from the mass of material treated, so that the metal may be said to be in massive form rather than in divided globular condition.

At this time, the metal is removed, the dross broken up and mixed with a flux of suitable material. The stirrer 15 is then positioned to be within the crucible, the cover 5 replaced, and the suction nozzle 7 is introduced through the opening 5ᵉ. With the stirrer in operation and the crucible under heat, the flux becomes thoroughly mixed with the dross material, and by the presence of the flux, the dross material is so acted upon that practically all included metal will be released.

The stirring is continued until all the metal is separated from the dross and the fluxing action has ceased.

This operation of stirring in the flux is carried on with the cover in place upon the crucible. Therefore, it is possible to control the character of the atmosphere above the bath. That is to say, it may be reducing or oxidizing to any desired degree, for by means of the nozzle 16, any character of gas may be introduced.

This is an important factor in economical treatment of metal, for if there be no control and the air have free access to the surface of the bath in the pot, an excess of oxygen will be present and so burn portions of the metal, which of course means loss. Furthermore, with excess of oxygen present, the surface action is very violent.

All of these undesirable features are eliminated by the control of the oxygen at the surface of the metal in the crucible.

If desired, this heating of flux and dross may be carried on in the presence of an inert or reducing gas.

The valve 38 will during this operation be opened and the fumes occasioned by the use of the flux within the crucible will be drawn through the nozzle 7, pipe 36 and pipe 37 to the fume arrester 18. In the chamber 19 of the fume arrester, the heavier particles of flux which may have come over with the fumes will settle in the lower part of the chamber 19, while those portions carried by the gas or air will pass into the chamber 20 and into contact with the wet strips 24, which strips may be wet with water or any other suitable solution which will remove the material that will be carried in the fumes, so that the gas or air in passing through the opening 27, will be practically free from obnoxious odors or materials. The flux recovered in the chamber 19 may be used over again.

After the agitation of the mixture within the crucible as just described, the nozzle 7 may be lowered into the crucible sufficiently far so as to remove by suction the dross or oxid which is light in weight, and which of course will form in this instance above the metal because no pressure has been applied. The dross will carry some portions of included metal, and as this dross passes through nozzle 7 and pipe 36 to the separator 28, the heavier particles will drop to the bottom of the chamber 29, from whence they may be removed, and may be separated or if desired, the material may be mixed with fresh supplies of scrap material and again subjected to the process. The lighter materials will pass to the chamber 32 and be collected therein through the instrumentality of the bags 34.

During the last mentioned operation, the valve 38 will be closed and the valve 39 opened.

The metal left in the melting pot may be poured out, if of sufficient quantity, and if not, it may be left, and a fresh quantity of scrap material added.

It will be apparent that the apparatus described is but one form which may be used in carrying out my process, and it is not my intention to limit the process in any way by the apparatus disclosed.

Where in the specification, I have used the term "scrap material," I intend to include scrapings, borings, turnings, clippings, punchings, sawings, etc., of the metal or an alloy of the metal which it is sought to recover.

Having thus described my invention, what I claim is:

1. The process of recovering a metal from scrap material which when melted forms distinct and separate bodies of metal which consists in heating the scrap material to or above the temperature at which it softens or melts, and applying pressure to the mass of material to unite the separated bodies of metal into a unitary mass.

2. The process of recovering a metal from scrap material which when melted forms distinct and separate bodies of metal which consists in heating the scrap material and when said material is in softened condition in applying pressure to the material, in again heating the material and subsequently applying pressure to the mass of material to unite the separated bodies of metal into a unitary mass.

3. The process of recovering a metal from scrap material which when melted forms distinct and separate bodies of metal which consists in heating the scrap material to or above the temperature at which it softens or melts, in which condition the metal is in separated particles or globules, and applying pressure to the mass of material to squeeze the metal particles into a unitary mass and separate them from the dross.

4. The process of recovering a metal from scrap material which when melted forms distinct and separate bodies of metal which consists in heating the scrap material to or above the temperature at which it softens or melts, in which condition the metal is in the form of globules surrounded by a coating of dross which prevents their union, and applying pressure to the mass of material to squeeze the metal particles into a unitary mass and separate the same from the dross.

5. The process of recovering a metal from scrap material, which consists in heating the scrap material to a softened condition, applying pressure to the mass of material, squeezing out the metal from the mass and pushing the dross below the metal, in removing the metal, mixing a flux with the dross, and stirring and heating the same.

6. The process of recovering a metal from scrap material which consists in heating the scrap material to a softened condition, compacting the metal and separating it from the dross, removing the metal, mixing a flux with the dross, stirring and heating the same, and by suction removing the fumes as the mass of material is heated, and recovering material in the fumes.

7. The process of recovering metal from scrap material which consists in heating the said material to a softened condition, compacting the metal and separating it from the dross, removing the metal, mixing a flux with the dross, heating the same, by suction removing the volatilized matter and fumes, and recovering the material in the fumes, and also by suction removing the dross and recovering the particles of metal therein.

8. In a process for recovering metal from scrap material, heating the scrap material and removing the metal from the dross, heating the said dross with the flux, removing the fumes by suction and recovering the material in the fumes, and removing the dross by suction and recovering the metal particles in the dross.

9. In a process for recovering metal from scrap material which consists in heating the scrap material and separating the metal from the dross, treating the dross with a flux, heating the same, and removing the dross by suction and separating the metal particles therefrom.

10. In a process for recovering metal from scrap material which consists in heating the scrap material and separating the metal from the dross, treating the dross with a flux, heating the same in an atmosphere controlled to prevent excessive oxidization, and removing the dross by suction and separating the metal particles therefrom.

11. The process of recovering metal from scrap material which consists in heating the said material to a softened condition, compacting the metal and separating it from the dross, removing the metal, mixing a flux with the dross, heating the same in an atmosphere controlled to prevent excessive oxidization, by suction removing the volatilized matter and fumes, and recovering the material in the fumes, and also by suction removing the dross and recovering the particles of metal therein.

In testimony whereof, I hereunto affix my signature in the presence of two witnesses.

JOHN W. BROWN.

Witnesses:
 A. J. HUDSON,
 L. I. PORTER.